(12) United States Patent
Tamura

(10) Patent No.: US 10,509,606 B2
(45) Date of Patent: Dec. 17, 2019

(54) IMAGE FORMING APPARATUS RETRIEVING ERROR SCREEN FROM WEB SERVER

(71) Applicant: CANON KABUSHIKI KAISHA, Tokyo (JP)

(72) Inventor: Makiya Tamura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/282,541

(22) Filed: Sep. 30, 2016

(65) Prior Publication Data

US 2017/0024168 A1 Jan. 26, 2017

Related U.S. Application Data

(63) Continuation of application No. 13/934,353, filed on Jul. 3, 2013, now abandoned, which is a continuation
(Continued)

(30) Foreign Application Priority Data

Mar. 30, 2010 (WO) .................. PCT/JP2010/055681

(51) Int. Cl.
*G06F 3/12* (2006.01)
*H04N 1/00* (2006.01)
*H04N 1/333* (2006.01)

(52) U.S. Cl.
CPC ............ *G06F 3/121* (2013.01); *G06F 3/1234* (2013.01); *G06F 3/1259* (2013.01); *G06F 3/1287* (2013.01); *G06F 3/1294* (2013.01); *H04N 1/00204* (2013.01); *H04N 1/00244* (2013.01); *H04N 1/00411* (2013.01); *H04N 1/00413* (2013.01); *H04N 1/00424* (2013.01); *H04N 1/00464* (2013.01); *H04N 1/00474* (2013.01);
(Continued)

(58) Field of Classification Search
CPC ........... H04N 1/33361; H04N 1/00413; H04N 1/00204; G06F 3/121; G06F 3/1234; G06F 3/1235; G06F 3/1261
USPC ....................................... 358/1.15
See application file for complete search history.

(56) References Cited

U.S. PATENT DOCUMENTS

| 2002/0184341 | A1* | 12/2002 | Bhatti | G06F 9/4446 709/219 |
| 2004/0190057 | A1* | 9/2004 | Takahashi | G06F 3/1205 358/1.15 |

(Continued)

*Primary Examiner* — Eric A. Rust
(74) *Attorney, Agent, or Firm* — Canon U.S.A., Inc. IP Division

(57) ABSTRACT

To provide a mechanism in which a browser appropriately notifies a user of a change in the state without waiting for an instruction from a server and displays an appropriate operation screen upon reception of the instruction from the server in an information processing apparatus executing a process based on a request from the server. Upon detection of a change in the state, a service provider 340 notifies a Web browser 330 of the state and content information corresponding to the state. The Web browser 330 displays a screen in accordance with the content information included in the notification of the change in the state from the service provider 340. In addition, the Web browser 330 accesses an URL in accordance with an instruction from a Web server 102 to acquire an appropriate operation screen and displays the operation screen.

11 Claims, 14 Drawing Sheets

Related U.S. Application Data of application No. 13/053,746, filed on Mar. 22, 2011, now Pat. No. 8,503,021.

(52) U.S. Cl.
CPC ..... H04N 1/00477 (2013.01); H04N 1/00482 (2013.01); H04N 1/00506 (2013.01); H04N 1/00973 (2013.01); H04N 1/33361 (2013.01); H04N 2201/0039 (2013.01); H04N 2201/0094 (2013.01)

(56) References Cited

U.S. PATENT DOCUMENTS

| | | | |
|---|---|---|---|
| 2005/0198225 A1* | 9/2005 | Osanai | G06F 9/4443 709/220 |
| 2005/0248805 A1* | 11/2005 | Shima | H04N 1/00244 358/1.15 |
| 2006/0176509 A1* | 8/2006 | Aoki | H04N 1/00209 358/1.15 |
| 2008/0002220 A1* | 1/2008 | Song | H04N 1/00222 358/1.15 |
| 2010/0231946 A1* | 9/2010 | Shozaki | H04N 1/00241 358/1.13 |

\* cited by examiner

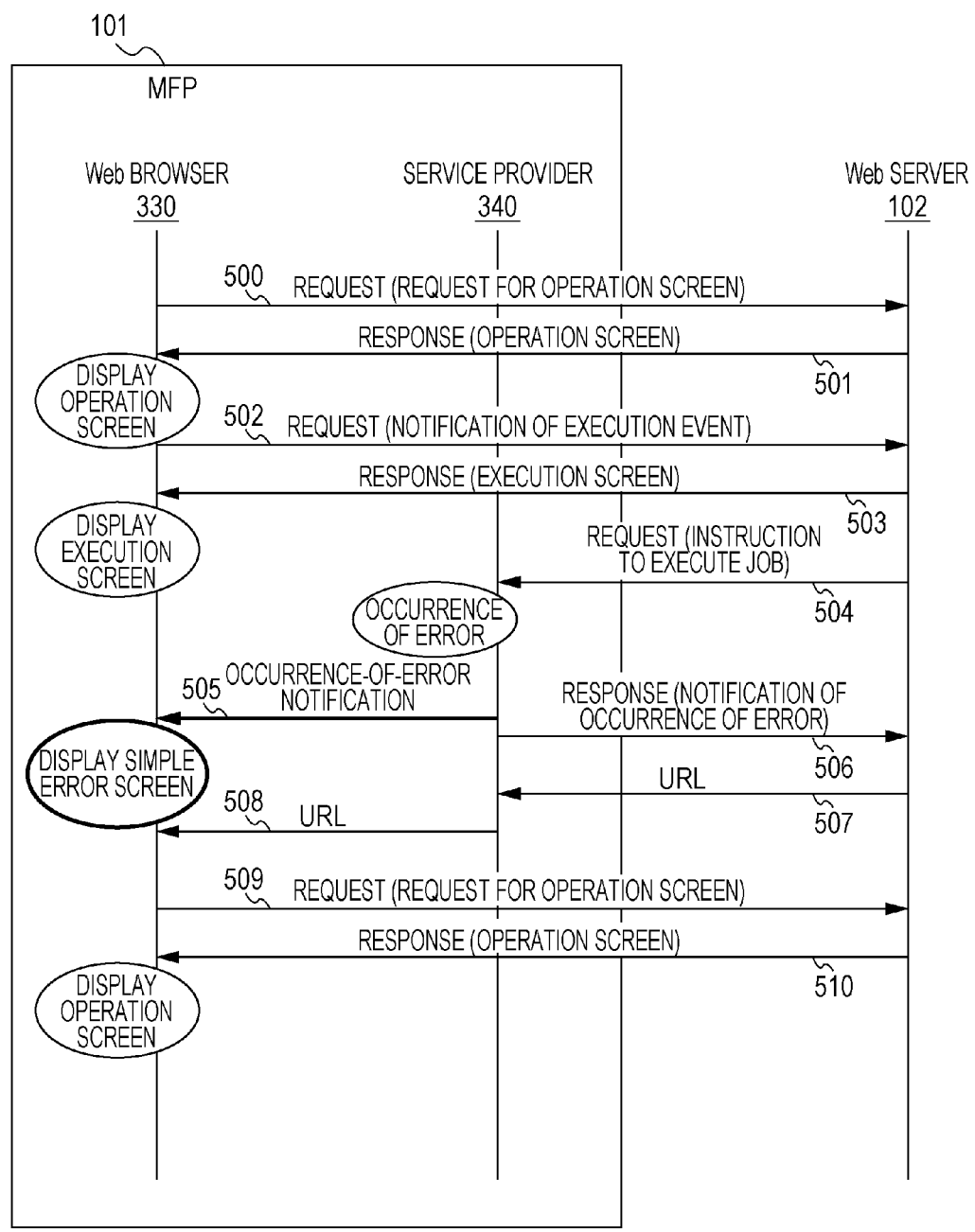

FIG. 6A

| Copy | Box | Send | Extension | Browser |

Scan and save

Folder name: AAA/BBB
File name: 20100219
Format: PDF
Resolution: 300 dpi

Scan

FIG. 6B

| Copy | Box | Send | Extension | Browser |

Scanning...

FIG. 6C

| Copy | Box | Send | Extension | Browser |

Error has occurred.

FIG. 6D

| Copy | Box | Send | Extension | Browser |

Fail to read.
Execute scanning again.

Folder name: AAA/BBB
File name: 20100219
Format: PDF
Resolution: 300 dpi

Scan

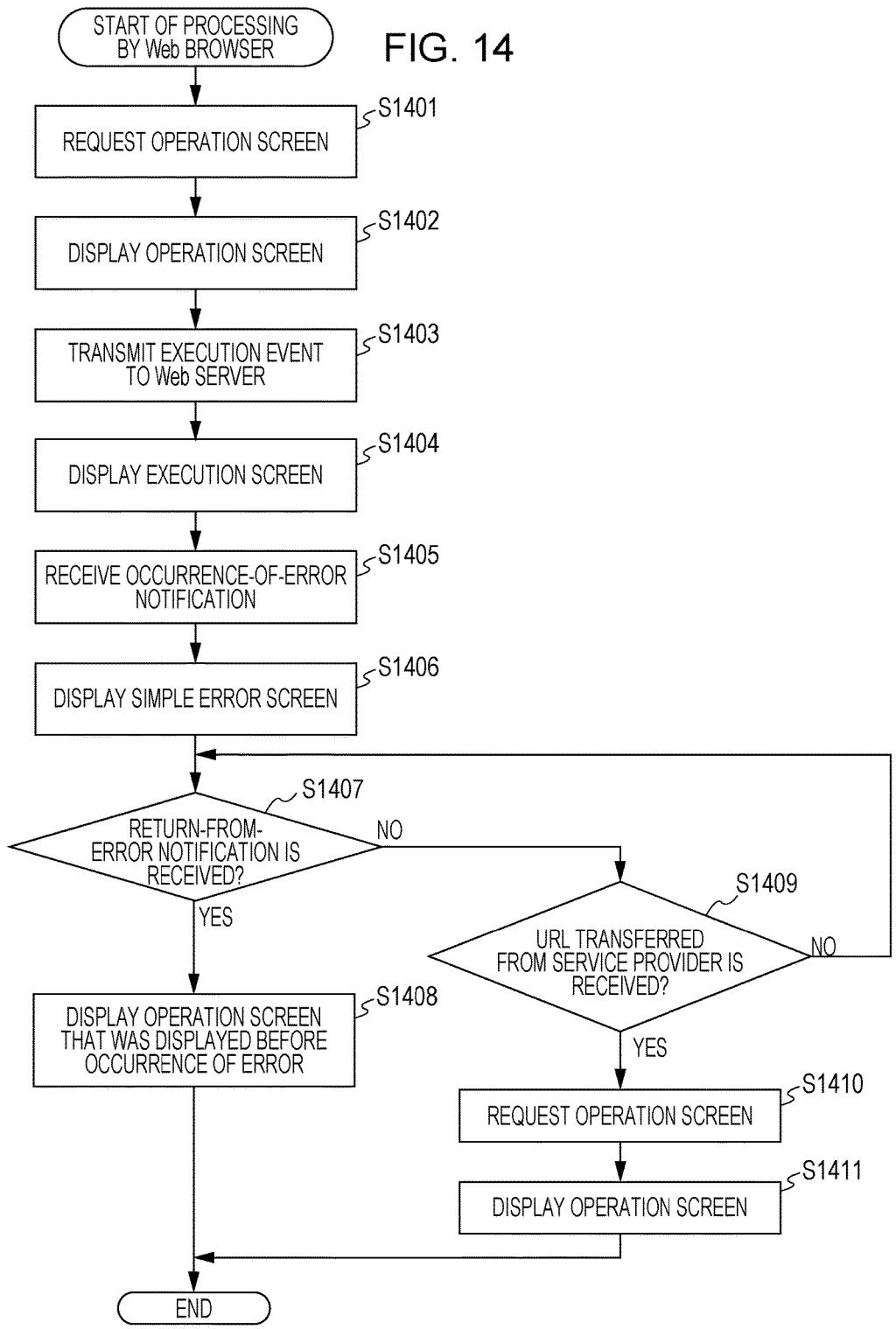

IMAGE FORMING APPARATUS RETRIEVING ERROR SCREEN FROM WEB SERVER

CROSS REFERENCE TO RELATED APPLICATIONS

This application is a Continuation of U.S. patent application Ser. No. 13/934,353 filed on Jul. 3, 2013, which is a Continuation of U.S. patent application Ser. No. 13/053,746 filed on Mar. 22, 2011, now U.S. Pat. No. 8,503,021, both of which claim the benefit of International Patent Application No. PCT/JP2010/055681, filed Mar. 30, 2010. All of these applications are hereby incorporated by reference herein in their entirety.

TECHNICAL FIELD

The present invention relates to an image processing apparatus capable of displaying an operation screen provided by an external apparatus connected via a network, a method of controlling the image processing apparatus, and a program.

BACKGROUND ART

Image processing systems in which multi function peripherals (MFPs) having Web browsers incorporated therein are capable of communicating with Web servers over networks are widely known. In such an image processing system, the MFP receives screen information that is provided by the Web server and that is described in, for example, Hypertext Markup Language (HTML) to display an operation screen used for operating the MFP. The MFP can receive various operations from a user with the operation screen. It is not necessary for the MFP to hold all the screen information used for displaying the operation screen of the MFP and it is possible to easily customize the operation screen from the Web server.

BACKGROUND ART

Image processing systems in which multi function peripherals (MFPs) having Web browsers incorporated therein are capable of communicating with Web servers over networks are widely known. In such an image processing system, the MFP receives screen information that is provided by the Web server and that is described in, for example, Hypertext Markup Language (HTML) to display an operation screen used for operating the MFP. The MFP can receive various operations from a user with the operation screen. It is not necessary for the MFP to hold all the screen information used for displaying the operation screen of the MFP and it is possible to easily customize the operation screen from the Web server.

In addition, Japanese Patent Laid-Open No. 2007-042098 discloses a case in which an error (for example, paper jam in a printer) occurs while a job is being executed in an MFP that executes the job in response to a request for a Web service from an external server. According to the technology in Japanese Patent Laid-Open No. 2007-042098, the MFP notifies the external server of the error if the above error occurs. The MFP acquires screen information transmitted from the external server to display an appropriate error screen. The above processing allows the Web server to easily customize, for example, a screen for indicating the content of the error and a screen for guiding a process to return from the error.

SUMMARY OF INVENTION

Technical Problem

However, the configuration of the image processing system disclosed in Japanese Patent Laid-Open No. 2007-042098 has the following problems. For example, if the above error occurs while a job is being executed, the MFP notifies the external server of the occurrence of the error (or requests an error screen from the external server) and waits for a response from the external server according to the technology in Japanese Patent Laid-Open No. 2007-042098. A time lag occurs in this process because the screen information on the error screen is acquired from the external server through the Web server and a network after the error has occurred to display the error screen. The user cannot know that the error has occurred during the time lag.

Configuring the MFP so that the screen information on the error screen is held by the MFP and displaying the error screen on the basis of the screen information held by the MFP if an error occurs cause no time lag to occur. However, it is not possible for the external apparatus to customize the error screen in this case.

BRIEF DESCRIPTION OF DRAWINGS

FIG. 5 is a sequence diagram indicating the operations of a Web browser 330, the Web server 102, and a service provider 340 in the embodiment of the present invention.

FIGS. 6A to 6D are diagrams showing transition of screens displayed by the Web browser 330 in the embodiment of the present invention.

FIG. 14 is a flowchart showing a process performed by the Web browser 330 in the embodiment of the present invention.

DESCRIPTION OF EMBODIMENTS

Embodiments of the present invention will herein be described in detail with reference to the attached drawings. The embodiments described below are not intended to limit the invention according to the claims. All the combinations of features described in the embodiments are not necessarily required for the solution of the invention.

First Embodiment

Figure 1:
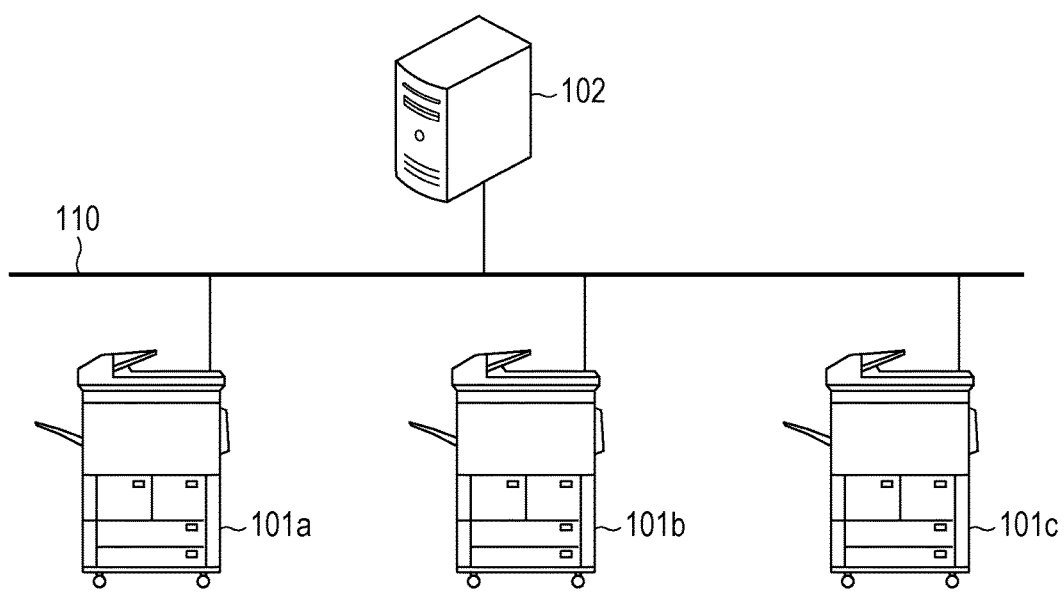
FIG. 1 is a general view of an image processing system in an embodiment of the present invention.

The configuration of an image processing system in the present embodiment will now be described with reference to FIG. 1. In the image processing system, an MFP 101a, an MFP 101b, an MFP 101c, and a Web server 102 are communicatably connected to each other over a local area network (LAN) 110.

The MFPs 101a to 101c each have multiple functions including a scan function, a print function, a copy function, and a transmission function. The MFPs 101a to 101c may have different functions or the same functions. The MFPs 101a to 101c are hereinafter considered as the same MFP and are simply referred to as an MFP 101. The MFP 101 is an example of an image processing apparatus and may be a single function peripheral (SFP) having any of the above functions. The MFP 101 further includes a Web browser 330 described below. The Web browser 330 is capable of receiving screen information from the Web server 102 to analyze the received screen information and displaying an operation screen in an operation unit of the MFP. The screen information is exemplified by HTML data described in the HTML format in the present embodiment. However, the screen information may be described by data in, for example, an Extensible Markup language (XML) format, a Wireless Markup Language (WML) format, or an Extensible Hypertext Markup Language (XHTML) format. The HTML data may refer to screen information described in another language.

The Web server 102 is an example of an external apparatus. A personal computer (PC), a storage device, another arithmetic unit may be used as another mode of the Web server 102. The example in which one Web server 102 provides services is given here. However, as another mode of the Web server 102, the Web server 102 may be composed of multiple servers and multiple virtual machines may be invoked in the server group to perform decentralized processing. In this case, a technology (cloud computing) called scale out in which the virtual machines are increased in number in accordance with a certain condition is used.

For example, a wide area network (WAN), a universal serial bus (USB) cable, or a wireless communication line may be used, instead of the LAN 110.

Figure 2:
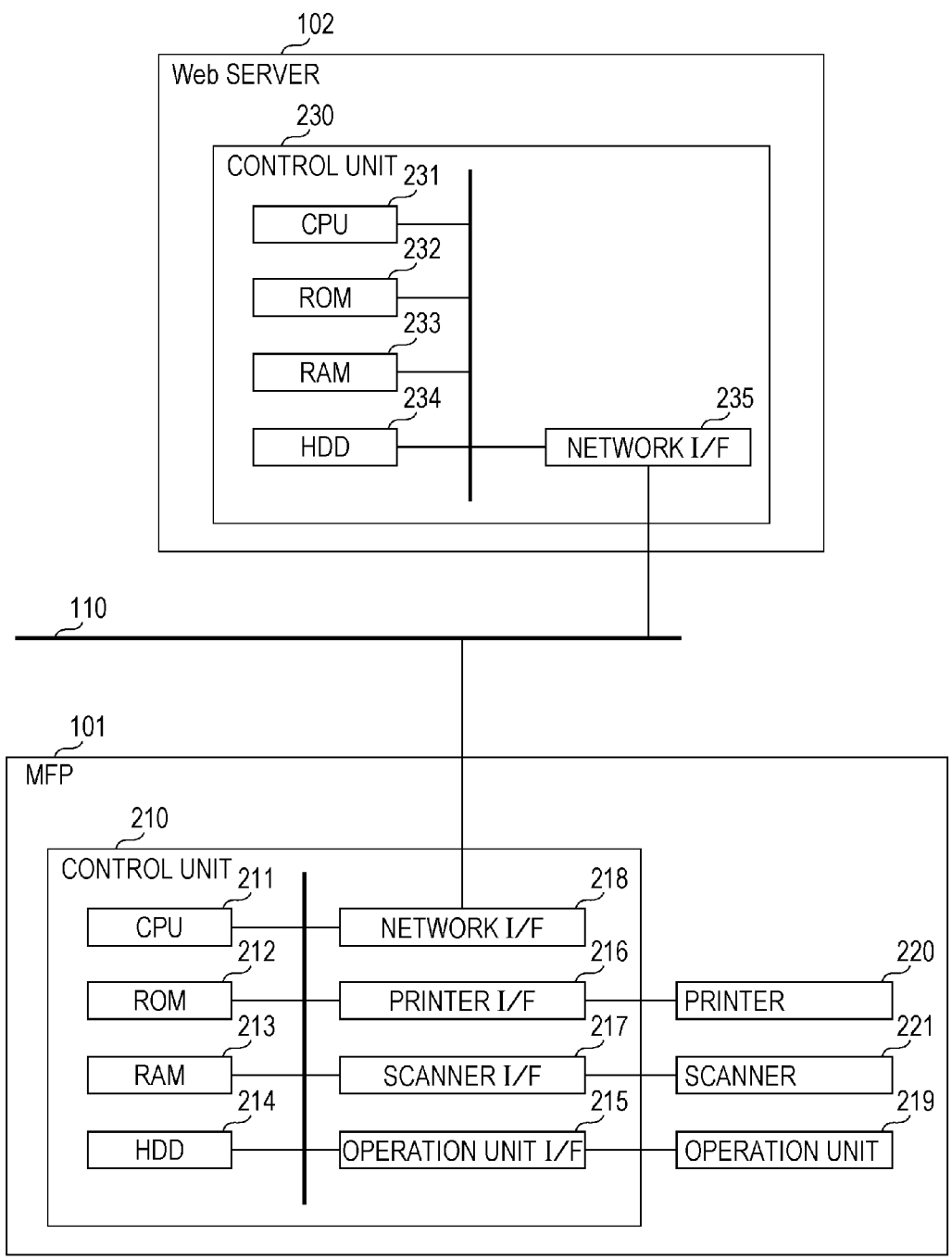
FIG. 2 is a block diagram showing the hardware configurations of an MFP 101 and a Web server 102 in the embodiment of the present invention.

The hardware configurations of the MFP 101 and the Web server 102 will now be described with reference to FIG. 2. The hardware configuration of the MFP 101 will be first described. A control unit 210 including a central processing unit (CPU) 211 controls the entire operation of the MFP 101. The CPU 211 included in the control unit 210 reads out control programs stored in a read only memory (ROM) 212 to perform a variety of control including scanning control and transmission control. A random access memory (RAM) 213 is used as a main memory of the CPU 211 and a temporary storage area, such as a working area.

A hard disk drive (HDD) 214 stores image data and various control programs or various information tables. An operation unit interface (I/F) 215 is an interface connecting an operation unit 219 and the control unit 210. The operation unit 219 is provided with, for example, a liquid crystal display having a touch panel function and a keyboard. The Web browser 330 in the MFP 101 displays an operation screen created on the basis of screen information received from the Web server 102 on the liquid crystal display of the operation unit 219.

A printer I/F 216 is an interface connecting a printer 220 and the control unit 210. Image data to be printed by the printer 220 is transferred from the control unit 210 through the printer I/F 216 and is printed on a recording medium in the printer 220.

A scanner I/F 217 is an interface connecting a scanner 221 and the control unit 210. The scanner 221 reads out an image on an original document to generate image data and supplies the image data to the control unit 210 through the scanner I/F 217.

A network I/F 218 is an interface connecting the control unit 210 (MFP 101) and the LAN 110. The network I/F 218 transmits a variety of information, such as image data, to the Web server 102 on the LAN 110 and receives a variety of information, such as image data, from the Web server 102 on the LAN 110.

The hardware configuration of the Web server 102 will also be described with reference to FIG. 2. A control unit 230 including a CPU 231 controls the entire operation of the Web server 102. The CPU 231 included in the control unit 230 reads out control programs stored in a ROM 232 to perform a variety of control processing. A RAM 233 is used as a main memory of the CPU 231 and a temporary storage area, such as a working area. An HDD 234 stores image data and various programs or various information tables described below.

A network I/F 235 is used to connect the control unit 230 (Web server 102) to the LAN 110. A variety of information is transmitted and received to and from another apparatus on the LAN 110 through the network I/F 235.

Figure 3:
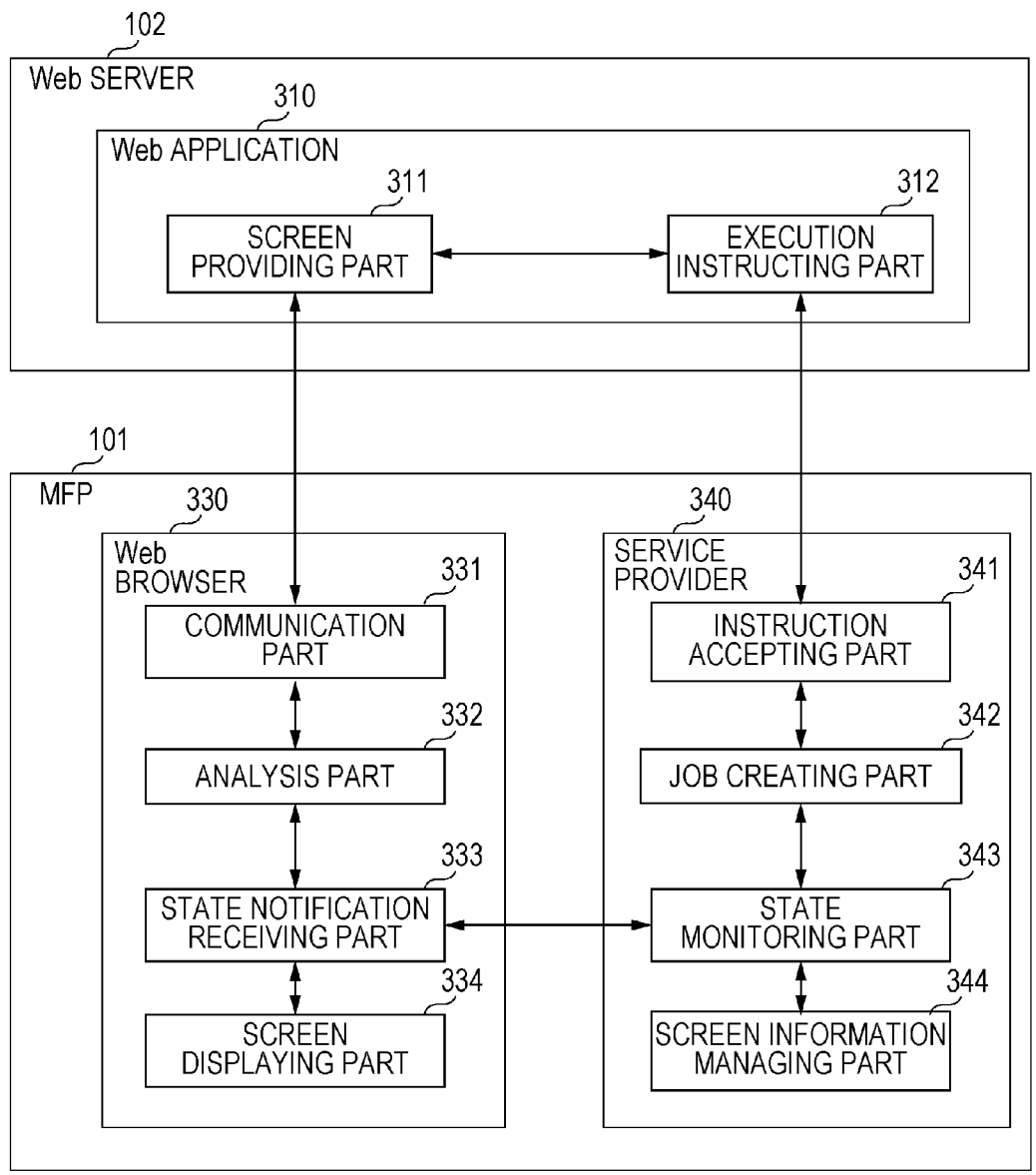
FIG. 3 is a block diagram showing the software configuration of the image processing system in the embodiment of the present invention.

The software configuration of the image processing system shown in FIG. 1 will now be described with reference to FIG. 3. The software configuration of the MFP 101 will be first described.

The MFP 101 has the Web browser 330 and a service provider 340 installed therein. The Web browser 330 and the service provider 340 are programs stored in the HDD 214 by the CPU 211 in the MFP 101.

The Web browser 330 communicates with the Web server 102 according to a Hypertext Transfer Protocol (HTTP). The Web browser 330 receives HTML data generated by the Web server 102 to create an operation screen, displays the operation screen in the operation unit 219, and controls the operation screen displayed in the operation unit 219. The Web browser 330 is capable of not only simply displaying an operation screen (second screen) on the basis of HTML data transmitted from the Web server 102 but also displaying an operation screen (first screen) on the basis of screen information, such as HTML data, stored in the HDD 214. The Web browser 330 may be realized by other software as long as the software is capable of communicating with an apparatus outside the MFP 101, acquiring screen information from the external apparatus, and displaying a screen in the operation unit 219.

The Web browser 330 includes a communication part 331, an analysis part 332, a state notification receiving part 333, and a screen displaying part 334.

The communication part 331 communicates with a screen providing part 311 in a Web application 310 according to the HTTP by using the network I/F 218. Specifically, the communication part 331 submits a request to a resource identified by a Uniform Resource Locator (URL) and receives a response to the request. In this process, communication data in various encoding formats is encoded and decoded. For example, in order to ensure the security of data that is being transmitted, communication is performed by using a Secure Socket Layer (SSL).

The analysis part 332 analyzes the HTML data included in the response received from the screen providing part 311 through the communication part 331. Then, the analysis part 332 creates an operation screen to be displayed on the Web browser 330.

The state notification receiving part 333 receives a notification (hereinafter also referred to as a "state notification") indicating that the processing state of the scanner 221 or the printer 220 is changed from a state monitoring part 343. The change in the processing state means, for example, an error state caused by an error occurring while a job is being executed, or return from the error state to a normal state. In addition, completion of a job is included in the change in the processing state. The error state indicates, for example, failure in scanning by the scanner 221, paper jam, shortage of paper, shortage of toner, or shortage of ink in the printer 220, or another hardware failure. The state notification receiving part 333 is capable of receiving HTML data used for displaying a simple screen (first screen) in the operation unit 219. The HTML data is stored in the HDD 214 in the MFP 101. The state notification receiving part 333 acquires the received HTML data to transfer the HTML data to the analysis part 332. The simple screen is a screen indicating an occurrence of an error or a screen indicating completion of a job.

The screen displaying part 334 displays the screen created by the analysis part 332 in the operation unit 219. The screen displaying part 334 is capable of displaying the simple screen (first screen) on the basis of not only the HTML data transmitted from the Web server 102 but also the HTML data stored in the HDD 214.

The Web browser 330 has the software configuration described above.

Next, the software configuration of the service provider 340 will be described. The service provider 340 is a module that provides a Web service requested from the Web server 102. The Web service is provided by software identified by a Uniform Resource Identifier (URI). In the present embodiment, the service provider 340 receives a request conforming to Simple Object Access Protocol (SOAP) from the Web server 102. The service provider 340 causes the scanner 221 or the printer 220 to execute a job as a Web service in accordance with the received request. The request transmitted from the Web server 102 is described in the Extensible Markup language (XML) format and includes settings for printing and scanning. For example, a message to request a job to "scan an original document and store the result of the scanning in a Tagged Image File Format (TIFF)" as a Web service is described in the request. The job is, for example, a "copy job", a "scan job", a "print job", a "transmission job", or a combination of theses jobs.

The service provider 340 includes an instruction accepting part 341, a job creating part 342, a state monitoring part 343, and a screen information managing part 344.

The instruction accepting part 341 receives a request conforming to the SOAP from the Web server 102 through the network I/F 218. Although the instruction accepting part 341 is provided separately from the communication part 331 in the Web browser 330 in the present embodiment, the same communication part may be used as the communication part 331 and the instruction accepting part 341. Although the SOAP is used as the communication protocol, another protocol may be used.

The job creating part 342 accepts the request received through the instruction accepting part 341 and creates a job to execute the job in order to provide the requested Web service. The job creating part 342 may interpret a job script, etc. embedded in a message conforming to the HTTP, received by the Web browser 330, to create a job.

The state monitoring part 343 monitors the states of the scanner 221, the printer 220, and other hardware while the job is being executed by the job creating part 342. If a change occurs in the states, the state monitoring part 343 internally transmits a state notification to the Web browser 330. Specifically, if the state monitoring part 343 detects an occurrence of an error, for example, failure in scanning in the scanner 221 or paper jam in the printer 220, the state monitoring part 343 transmits an occurrence-of-error notification indicating the occurrence of the error to the Web browser 330. If the state monitoring part 343 detects return from an error, the state monitoring part 343 transmits a return-from-error notification indicating return from the error. If the state monitoring part 343 detects that a job is normally completed, the state monitoring part 343 transmits a job completion notification indicating that the job is normally completed. As described above, the state monitoring part 343 transmits the state notification indicating that the processing state of the MFP 101 is changed to the Web browser.

The state monitoring part 343 transmits the state notification and also transmits HTML data on a simple screen corresponding to the detected change in the processing state. The HTML data is stored in the HDD 214 by the screen information managing part 344 in association with the processing state detected by the state monitoring part 343.

The MFP 101 has the software configuration described above.

The software configuration of the Web server 102 will now be described also with reference to FIG. 3. The Web server 102 has the Web application 310 installed therein. Upon reception of a request from the Web browser 330, the Web application 310 transmits a response to the Web browser to transmit screen information used for displaying an operation screen and image data. In addition, the Web application 310 transmits a request to request a Web service to the service provider 340 and receives a response transmitted from the service provider 340.

The Web application 310 includes the screen providing part 311 and an execution instructing part 312.

The screen providing part 311 communicates with the communication part 331 in the MFP 101 according to the HTTP through the network I/F 218. The screen providing part 311 transmits HTML data for displaying an operation screen in the operation unit 219 in the Web browser 330. In addition, the screen providing part 311 receives a user's instruction (execution event) input with an operation screen displayed in the operation unit 219 in the Web browser 330 as a request from the MFP 101. The screen providing part 311 transmits information on the operation screen to the Web browser 330 as a response to the request. In addition, the screen providing part 311 notifies the execution instructing part 312 of the instruction or the execution event input with the operation screen displayed in the Web browser 330.

Although the screen providing part 311 and the execution instructing part 312 are provided in the same Web server 102, the screen providing part 311 and the execution instructing part 312 may be provided in different apparatuses. In this case, an apparatus having the screen providing part 311 installed therein communicates with an apparatus having the execution instructing part 312 installed therein over a network or another communication line.

The execution instructing part 312 acquires the execution event notified from the screen providing part 311 to create a request to request a Web service from the service provider 340 in the MFP 101. Specifically, this request is a message conforming to the SOAP. The execution instructing part 312 transmits the created request to the service provider 340. The execution instructing part 312 may include an URI corresponding to an operation screen to be displayed in the Web browser 330 upon completion of the job in the request to be transmitted to the service provider 340 as a return URI.

Figure 4:
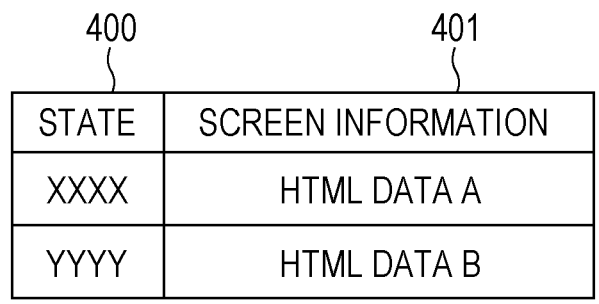
FIG. 4 is a diagram for describing data managed by a screen information managing part 344 in the embodiment of the present invention.

A database managed by the screen information managing part 344 will now be described with reference to FIG. 4. Each record in the database shown in FIG. 4 includes a state 400 and screen information 401 as elements. Specifically, the screen information managing part 344 manages multiple processing states in the HDD 214 in association with screen information on screens to be displayed when the states corresponding to the processing states occur.

An operation of the image processing system in the present embodiment will now be described with reference to FIG. 5. FIG. 5 is a sequence diagram indicating the operations of the Web browser 330, the service provider 340, and the Web server 102 (Web application). It is assumed in the sequence diagram in FIG. 5 that an error occurs while the service provider 340 is executing a job. The operation when a job is normally completed without an occurrence of an error will be described below with reference to FIG. 7.

First, the Web browser 330 transmits a request 500 to the Web application 310 in the Web server 102. The request 500 is submitted to request screen information on an operation screen shown in FIG. 6A.

Next, the Web server 102 receives the request 500 from the Web browser 330 and transmits a response 501 to the request 500 to the Web browser 330. The response 501 includes the screen information on the operation screen shown in FIG. 6A. The exchange of the request and the response may be repeated multiple times between the Web browser 330 and the Web application 310.

The Web browser 330 analyzes HTML data included in the response 501 received from the Web server 102 to display an operation screen created on the basis of the result of the analysis in the operation unit 219. The operation screen in FIG. 6A is an example of the screen displayed by the screen displaying part 334 in the operation unit 219. FIG. 6A shows an operation screen for executing a series of jobs to "scan an original document and store the result of the scanning". The case in which the series of jobs to "scan an original document and store the result of the scanning" are executed is exemplified in the following description. However, instead of the above series of jobs, a job using another function of the MFP may be executed. For example, a "copy job", a "transmission job", or a "print job" may be executed.

Forms for setting a folder name, a file name, a file format, and a resolution and a Scan button are displayed on the operation screen in FIG. 6A. When the user inputs the settings in the forms and presses the Scan button, the Web server 102 is notified of the execution event for scanning. The settings may be set on the operation screen in FIG. 6A or parameters which the Web application 310 holds in advance as default settings may be used.

The Web browser 330 transmits a request 502 to the Web application 310 in response to the user's operation with the operation screen in FIG. 6A. The request 502 includes the execution event indicating that the Scan button is pressed in response to the user's operation and the settings of the folder name, the file name, the file format, and the resolution.

The Web server 102 receives the request 502 from the Web browser 330 and transmits a response 503 to the request 502 to the Web browser 330. The Web browser 330 displays an execution screen in FIG. 6B in the operation unit 219 on the basis of the received response 503. The screen in FIG. 6B indicates that a job in accordance with the execution event instructed by the user with the operation screen in FIG. 6A is being executed (scanned).

Next, the Web server 102 transmits a request 504 to the service provider 340. The request 504 includes a message to request the service provider 340 to execute the job to "scan an original document and store the result of the scanning" as a Web service.

The service provider 340 receives the request 504 from the Web server 102 and executes the requested job in accordance with the received request 504.

If an error occurs due to any cause during the execution of the job in response to the request 504, the state monitoring part 343 in the service provider 340 detects the occurrence of the error. The state monitoring part 343 refers to the screen information corresponding to the detected error in the screen information managing part 344 to acquire HTML data stored in the HDD 214 in association with the state of the error that has occurred. The HTML data is screen information for displaying an error screen in the operation unit 219. The state monitoring part 343 transmits an occurrence-of-error notification 505 notifying the occurrence of the error to the Web browser 330, along with the HTML data acquired from the HDD 214 through the screen information managing part 344.

The Web browser 330 receives the occurrence-of-error notification 505 and the HTML data on the error screen. The Web browser 330 determines that the error has occurred on the basis of the reception of the occurrence-of-error notification 505. The Web browser 330 displays an error screen in FIG. 6C on the basis of the received HTML data.

FIG. 6C shows an example of the error screen. A message indicating to the user that the error has occurred is displayed in the screen shown in FIG. 6C. The screen shown in FIG. 6C is an example of the first screen.

The service provider 340 transmits a response 506 to the Web server 102. The response 506 indicates, for example, that the error has occurred in response to the request 504 transmitted from the Web server 102 and the job is suspended. The Web server 102, which receives the response 506, transmits an URL 507 indicating the position where the HTML data for displaying the operation screen corresponding to the error is stored to the service provider 340. The Web server 102 transmits the URL 507 to cause the service provider 340 to display a screen appropriate for the change in the state of the MFP 101. The Web server 102 may directly transmit HTML data, which is screen information, to the service provider 340, instead of the transmission of the URL.

The service provider 340 receives the URL 507 and transfers the URL 507 to the Web browser 330 as an URL 508. The Web browser 330 is capable of receiving a notification and screen information from the service provider 340. In other words, the Web browser 330 is capable of not only communicating with the Web application 310 in the Web server 102 but also receiving a special command from the service provider 340.

The Web browser 330 requests an operation screen corresponding to the error on the basis of the URL 508 received from the service provider 340. Specifically, the Web browser 330 transmits a request 509 to the Web server 102. The request 509 is submitted to request an operation screen corresponding to the error state.

The Web server 102 receives the request 509 from the Web browser 330 and transmits the HTML data identified by the URL 508 included in the request 509 as a response 510.

The Web browser 330 receives the response 510 from the Web server 102 and displays an operation screen in FIG. 6D in the operation unit 219 on the basis of the screen information included in the response 510. Messages indicating that the error has occurred in the scanning and prompting the re-execution of the scanning are displayed on the operation screen in FIG. 6D. The user confirms the error state, if necessary, and presses the Scan button on the operation screen to cause the MFP 101 to execute the same job again or to execute a job in which the settings are changed. The screen shown in FIG. 6D is an example of the second screen.

Figure 7:
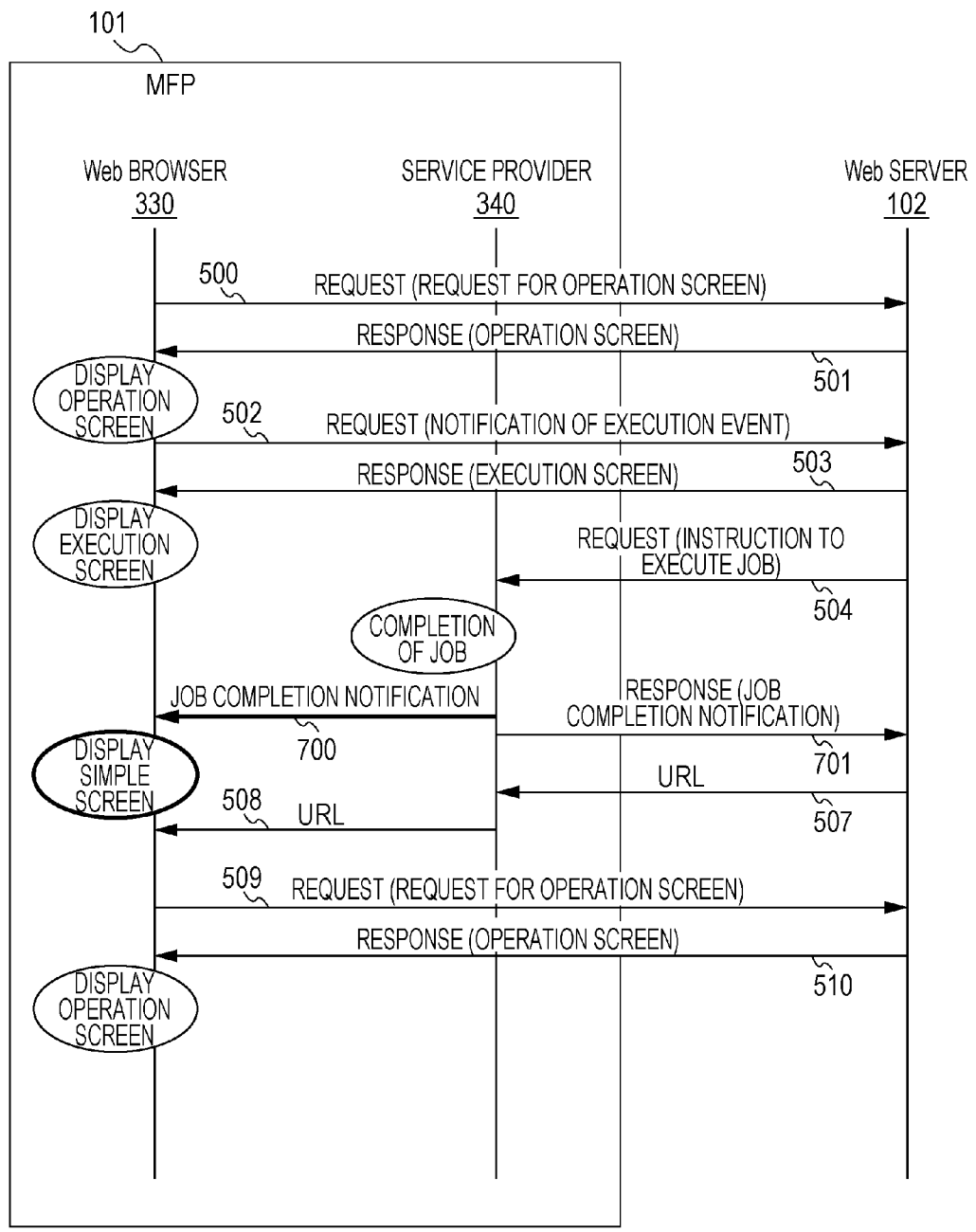
FIG. 7 is a sequence diagram indicating the operations of the Web browser 330, the Web server 102, and the service provider 340 in the embodiment of the present invention.

FIG. 7 is a sequence diagram indicating the operations of the Web browser 330, the service provider 340, and the Web server 102 (Web application). FIG. 5 shows the case in which an error occurs while the service provider 340 is executing a job whereas FIG. 7 shows a case in which a job executed by the service provider 340 is normally completed.

The sequence from 500 to 504 in FIG. 7, that is, the operation until the Web server 102 transmits the request 504 to the service provider 340 is the same as in FIG. 5. FIG. 7 differs from FIG. 5 in that the service provider 340 transmits a job completion notification 700 to the Web browser 330 and that the service provider 340 transmits a response 701 indicating that the job is completed to the Web server 102. The above points will now be described.

When the job based on the request 504 received from the Web server 102 is completed, the service provider 340 detects a change in the processing state caused by the completion of the job. Upon detection of the change in the processing state, the state monitoring part 343 refers to screen information (HTML data) stored in the HDD 214 in association with the state 400 indicating the completion of the job to acquire the HTML data. The HTML data is screen information on a screen for simply notifying the operation unit 219 of the completion of the job. The state monitoring part 343 transmits the job completion notification 700 indicating that the job is completed to the Web browser 330, along with the HTML data acquired from the HDD 214 through the screen information managing part 344.

Figure 8A:
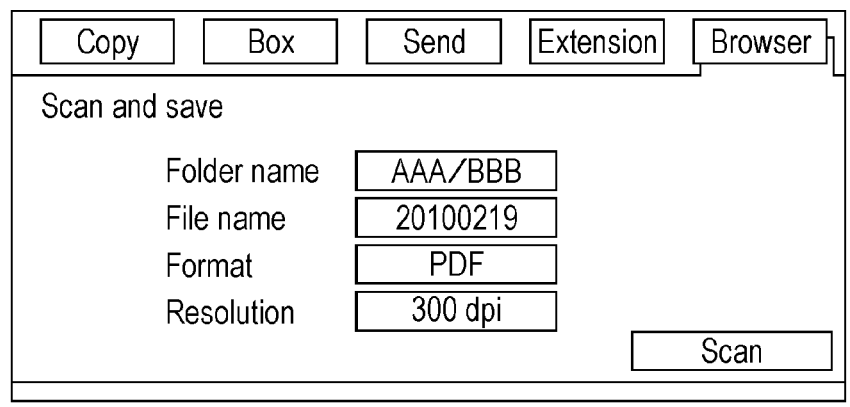
FIGS. 8A to 8D are diagrams showing transition of screens displayed by the Web browser 330 in the embodiment of the present invention.
Figure 8B:
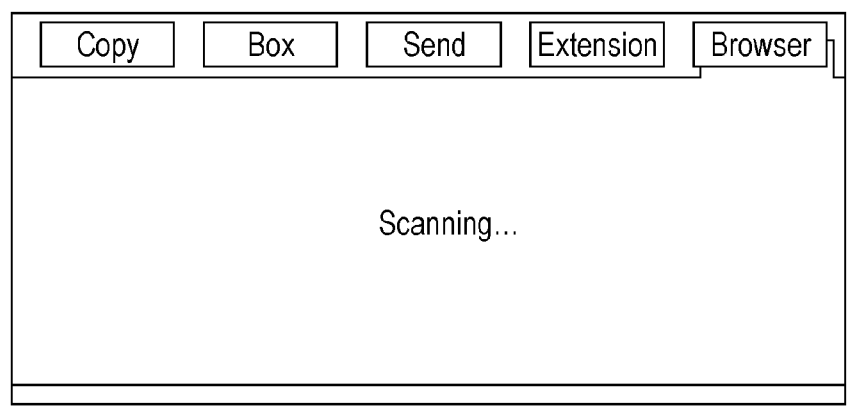
Figure 8C:
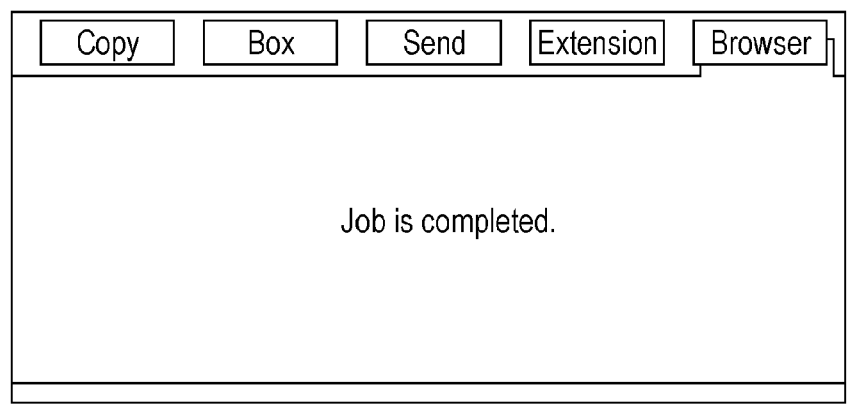

The Web browser 330 receives the job completion notification 700 and the HTML data. Then, the Web browser 330 displays an operation screen in FIG. 8C in the operation unit 219 on the basis of the HTML data received with the job completion notification 700. The screen shown in FIG. 8C is an example of the first screen displayed on the basis of the screen information stored in the HDD 214 by the screen information managing part 344. A message indicating to the user that the job is completed is displayed on the screen shown in FIG. 8C. As a result, the user can immediately know that the job is completed without waiting for the display of the operation screen (second screen) based on the screen information received from the Web server 102.

The service provider 340 receives the URL 507 and transfers the URL 507 to the Web browser 330 as the URL 508. The URL 507 is the same as the URL 508.

The Web browser 330 requests an operation screen to be displayed after the job is executed on the basis of the URL 508 received from the service provider 340.

The Web server 102 receives the request 509 from the Web browser 330 and transmits the HTML data identified by the URL 508 included in the request 509 as the response 510.

Figure 8D:
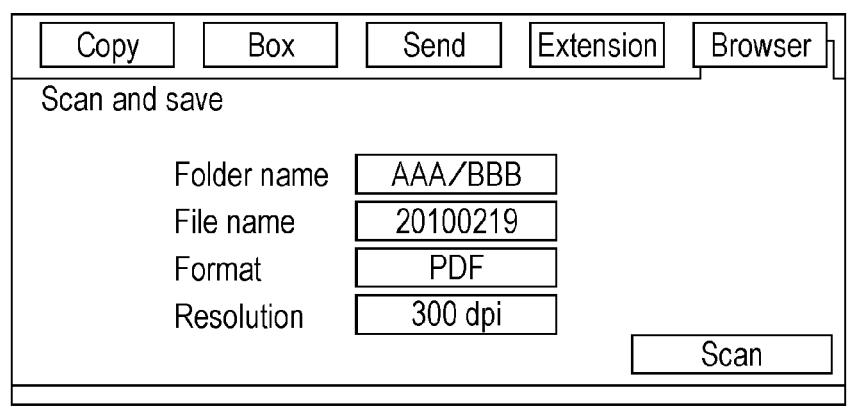

The Web browser 330 receives the response 510 from the Web server 102 and displays an operation screen in FIG. 8D in the operation unit 219 on the basis of the screen information included in the response 510.

The screen shown in FIG. 8D is an example of the second screen displayed on the basis of the screen information received from the Web server 102. Although the operation screen in FIG. 8D is the same as that in FIG. 8A in the present embodiment, the operation screen in FIG. 8D may be an operation screen on which setup information about the job the execution of which is completed, a history, etc. is displayed in detail or an operation screen of a job to be executed next.

Figure 9:
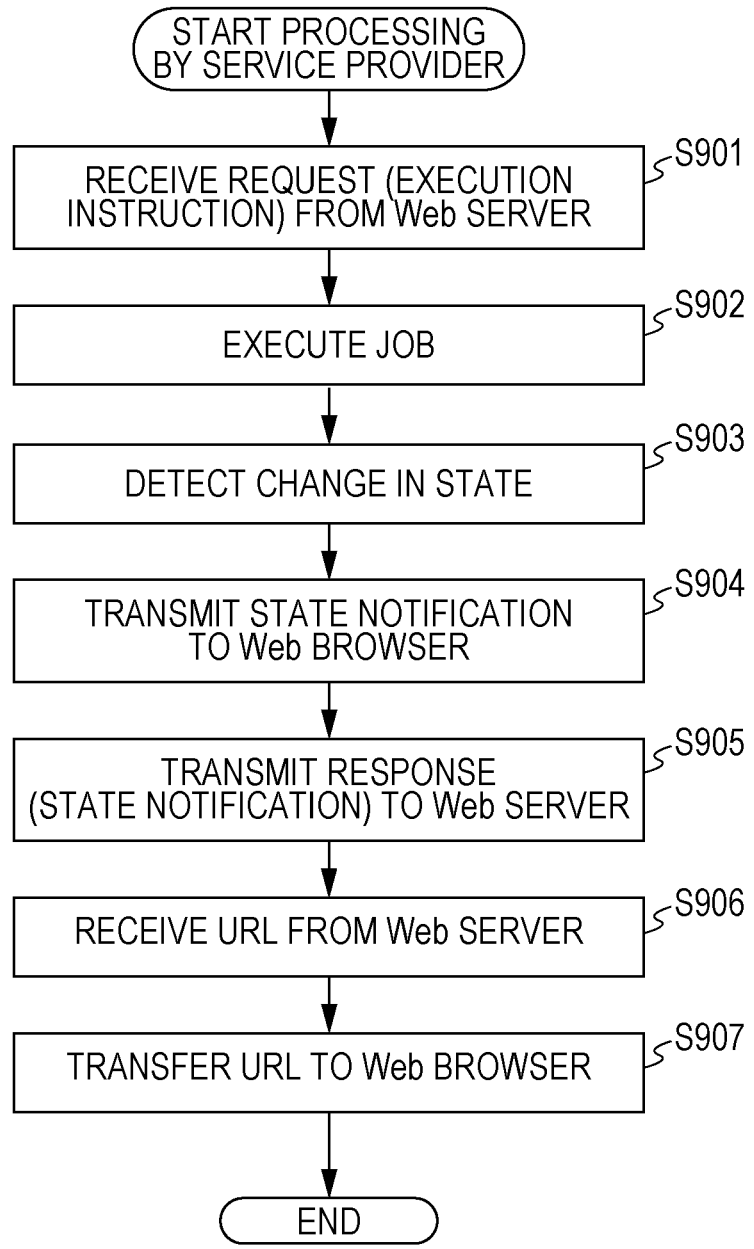
FIG. 9 is a flowchart showing a process performed by the service provider 340 in the embodiment of the present invention.

A process performed by the service provider 340 in the MFP 101 will now be described with reference to a flowchart in FIG. 9. Each step shown in the flowchart in FIG. 9 is realized by the CPU 211 that executes a program stored in the ROM 212.

In Step S901 (the notation of Step is hereinafter omitted), the instruction accepting part 341 receives the request 504 from the execution instructing part 312 in the Web server 102.

In S902, the job creating part 342 invokes a Web service in accordance with a message included in the request 504 received through the instruction accepting part 341. Specifically, the job creating part 342 creates a job to "scan an original document and store the result of the scanning", causes the scanner 221 to scan an original document, and stores a file in a specified folder in a specified external apparatus via the network I/F 218.

In S903, the state monitoring part 343 detects a change in the processing state of the job. For example, the state monitoring part 343 detects an occurrence of an error during the execution of the processing by the job creating part 342 or detects completion of the job. Upon detection of a change in the processing state of the job, in S904, the state monitoring part 343 transmits the state notification to the notification receiving part 333 in the Web browser 330. Specifically, if the state monitoring part 343 detects an occurrence of an error, the state monitoring part 343 transmits the occurrence-of-error notification 505 shown in FIG. 5. If the job is completed, the state monitoring part 343 transmits the job completion notification 700 shown in FIG. 7 (the occurrence-of-error notification 505 and the job completion notification are hereinafter collectively referred to as the state notification).

The state monitoring part 343 acquires information (HTML data) on the operation screen corresponding to the detected change in the state of the processing from the screen information managing part 344 and transmits the information (HTML data) on the operation screen, along with the state notification. The state monitoring part 343 transmits the HTML data corresponding to the state, which is included in the state notification. For example, HTML data A is transmitted if an error occurs and HTML data B is transmitted if the job is completed. The screen information managed by the screen information managing part 344 in the HDD 214 may be divided on the basis of the error state. For example, the HTML data when a scanning error occurs in the scanner 221 may be differentiated from the HTML data when a paper-jam error occurs in the printer 220.

In S905, the instruction accepting part 341 transmits the response 506 to the execution instructing part 312 in the Web server 102 in response to the detection of the processing state by the state monitoring part 343. The MFP 101 transmits the notifications indicating that the error occurs to the Web browser 330 and the Web server 102 in S904 and S905.

In S906, the instruction accepting part 341 receives the URL 507 from the execution instructing part 312 in the Web server 102. The URL 507 indicates the location where the HTML data on the operation screen corresponding to the error state is stored by the Web browser 330. The instruction accepting part 341 supplies the URL 507 to the state monitoring part 343.

In S907, the state monitoring part 343, which receives the URL 507, transfers the URL 508 to the state notification receiving part 333 in the Web browser 330.

Figure 10:
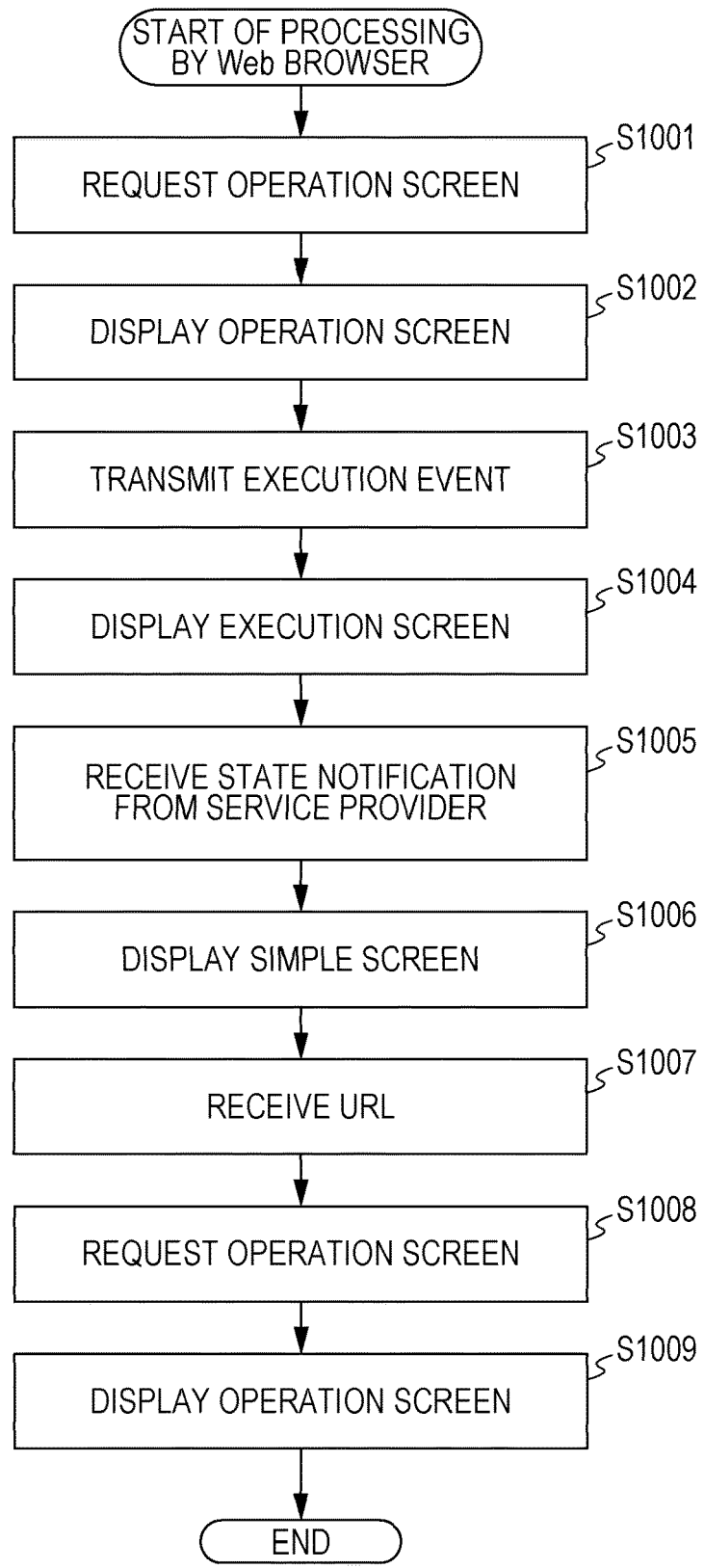
FIG. 10 is a flowchart showing a process performed by the Web browser 330 in the embodiment of the present invention.

A process performed by the Web browser 330 will now be described with reference to a flowchart in FIG. 10. Each step shown in the flowchart in FIG. 10 is realized by the CPU 211 that executes a program stored in the ROM 212. The process in the flowchart in FIG. 10 is started in response to an invocation instruction of the Web browser 330 from the user and a request to the Web server 102 for an operation screen from the Web browser 330.

In S1001, the Web browser 330 performs a process to request the operation screen in FIG. 6A. The communication part 331 transmits the request 500 according to the HTTP to the screen providing part 311 in the Web server 102. The request 500 may be transmitted on the basis of an initially displayed URL managed by the Web browser 330 or may be transmitted on the basis of an URL specified by the user.

In S1002, the Web browser 330 performs a process to display the operation screen shown in FIG. 6A. The communication part 331 receives the response 501 from the Web server 102. The analysis part 332 acquires HTML data through the communication part 331 and analyzes the HTML data to create the operation screen. The screen displaying part 334 displays the operation screen created by the analysis part 332 in the operation unit 219. Then, the user sets the values of a folder name, a file name, a file format, a resolution, etc. with the operation screen displayed in the operation unit 219 and presses the Scan button.

In S1003, the communication part 331 transmits the user's operation (execution event) performed with the operation screen in FIG. 6A to the Web server 102.

In S1004, the Web browser 330 performs a process to display the execution screen in FIG. 6B. Specifically, the communication part 331 receives the response 503 from the screen providing part 311. HTML data for displaying the execution screen is described in the response 503. The analysis part 332 analyzes the HTML data to create the execution screen, and the screen displaying part 334 displays the execution screen created by the analysis part 332 in the operation unit 219.

In S1005, the state notification receiving part 333 receives a state notification (the occurrence-of-error notification 505 or the job completion notification 700) from the service provider 340.

In S1006, the state notification receiving part 333 transfers the HTML data included in the state notification received from the state monitoring part 343 in the service provider 340 to the analysis part 332. The screen displaying part 334 displays a simple screen created on the basis of the result of the analysis in the HTML analyzed by the analysis part 332 in the operation unit 219. The simple screen in the present embodiment is, for example, a screen simply indicating that an error has occurred, such as the one shown in FIG. 6C, or a screen simply indicating that the job is completed, such as the one shown in FIG. 8C. However, instead of the simple screen in FIG. 6C or FIG. 8C, a more detailed screen may be displayed.

According to S1006, upon occurrence of an error, it is possible to immediately indicate to the user that the error has occurred. For example, it is possible to avoid a situation in which no error screen is displayed despite the fact that an error occurs during the processing by the MFP to prevent the user from being confused.

Upon completion of the job, it is possible to immediately notify the completion of the job. For example, it is not necessary for the user notified of the completion of the job to wait for display of the next operation screen (FIG. 8D) and the user may leave from the MFP 101 at the time when the simple screen in FIG. 8C is displayed in the operation unit 219.

In S1007, the state notification receiving part 333 receives the URL 508 transferred from the state monitoring part 343 in the service provider 340. The URL 508 indicates the location where the HTML data on the operation screen in FIG. 6D corresponding to the error state or the operation screen in FIG. 8D corresponding to the completion of the execution of the job is stored.

In S1008, the communication part 331 transmits the request 509 to the Web server 102 to request an operation screen on the basis of the URL 508 received by the state notification receiving part 333.

In S1009, the communication part 331 receives the response 510 to the request 509 requesting an operation screen from the screen providing part 311 in the Web server 102. The analysis part 332 analyzes the HTML data included in the response 510. Then, the screen displaying part 334 displays the operation screen corresponding to the detected processing state in the operation unit 219 on the basis of the result of the analysis of the HTML data by the analysis part 332. The operation screen displayed in S1009 preferably includes a detailed message, compared with the simple screen displayed in S1006. For example, in the case of the screen corresponding to an error, a screen including a guidance to return an abnormal state, such as an error state, to a normal state or a screen indicating in detail the content of the error is preferably displayed. In the above cases, it is possible to acquire a screen to be displayed in the MFP 101 from the external Web server 102 to display a more detailed screen. In addition, it is possible to display the operation screen that is easily customized in the Web server in the MFP 101.

As described above, according to the present embodiment, when the processing state of the MFP 101 is changed, the Web browser 330 displays a screen managed by the screen information managing part 344 in the operation unit 219 and, then, displays an operation screen corresponding to the change in the processing state on the basis of the screen information received from the Web server 102. As a result, the user can immediately know the change in the processing state and can acquire detailed screen information including, for example, an operation method to be performed in response to the change in the processing state from the Web server.

The examples of the change in the processing state include the case in which an error occurs and a case in which the job is completed in the first embodiment. However, the change in the processing state in the present embodiment is not limited to the above processing changes. For example, the change in the processing state may be exemplified by a case in which the processing in the service provider 340 is changed from the scanning to the transmission through the printing.

Multiple pieces of screen information are stored in the screen information managed by the screen information managing part 344 depending on the column "state" in the first embodiment. However, it is not necessary to store the multiple pieces of screen information in association with the corresponding processing states in order to only notify an occurrence of an error. In this case, it is sufficient to manage only the screen information for displaying an error screen simply indicating that an error occurs.

As another modification, the simple screen, such as an error screen or a job completion screen, may be displayed not by the Web browser 330 but by the service provider 340 itself. In this case, the service provider 340 is provided with a screen displaying part different from the screen displaying part 334 in the Web browser 330. With this configuration, it is not necessary to transmit the state notification and the screen information to the Web browser 330 and, thus, it is possible to more rapidly display the simple screen.

Second Embodiment

A second embodiment will now be described. If the processing state of the service provider 340 is changed, the service provider 340 in the MFP 101 transmits the screen information (HTML data) to the Web browser 330, along with the state notification, in the first embodiment. In contrast, the second embodiment is characterized in that the service provider 340 transmits only the state notification. The second embodiment is also characterized in that the Web browser 330 displays the simple screen on the basis of the screen information held in the Web browser 330.

Figure 11:
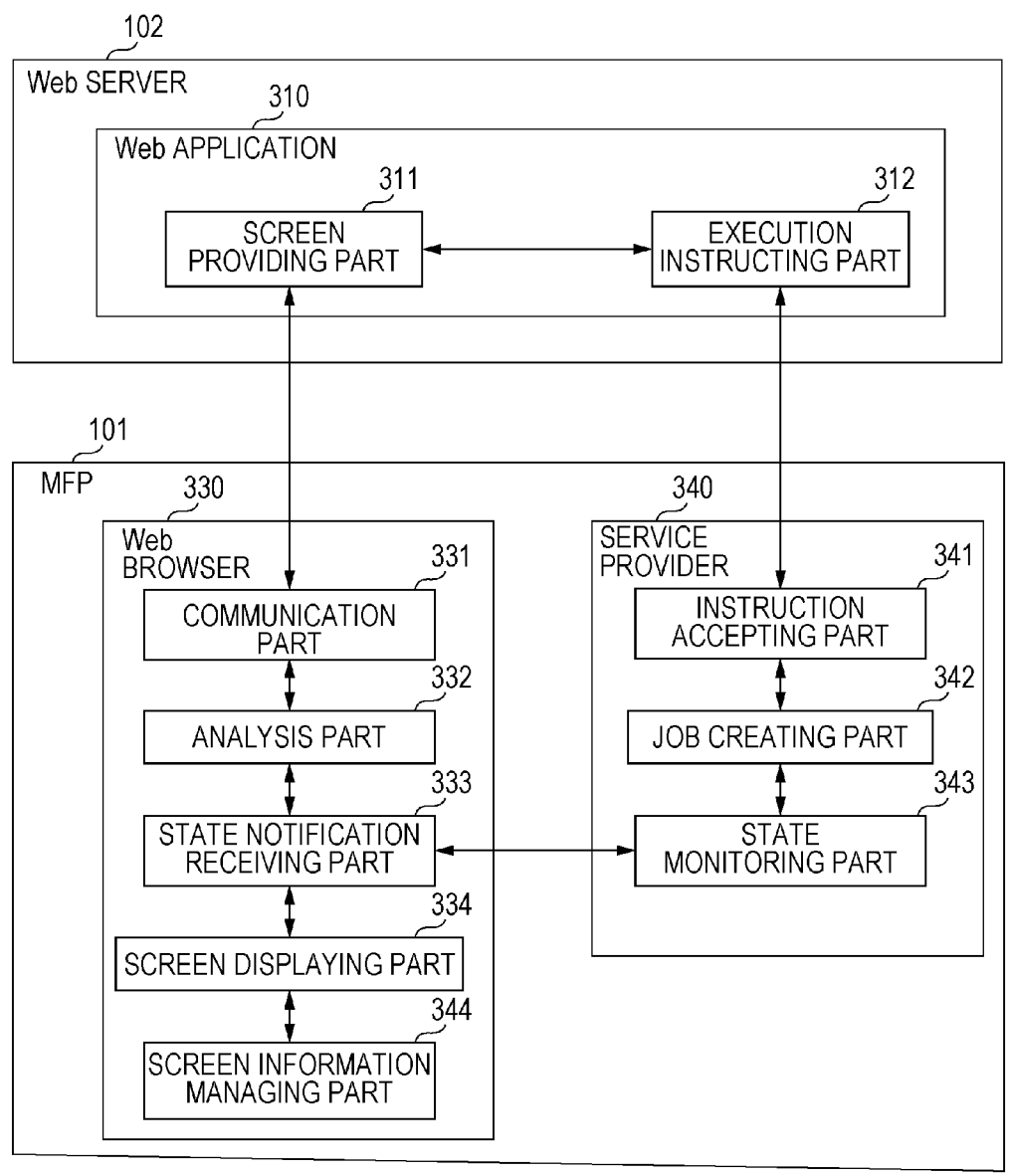
FIG. 11 is a block diagram showing the software configuration of an image processing system in an embodiment of the present invention.

The software configuration of an image processing system in the second embodiment will now be described with reference to FIG. 11. The software configuration in the second embodiment differs from that in the first embodiment in that the screen information managing part 344 is arranged in the Web browser 330, which is arranged in the service provider 340 in the first embodiment. Since the software configuration other than this point is substantially similar to the one in FIG. 3, a description thereof is omitted herein. The hardware configurations of the MFP 101 and the Web server 102 in the second embodiment are the same as the ones shown in FIG. 2.

A process performed by the service provider 340 in the MFP 101 will now be described with reference to the flowchart in FIG. 9. Only the difference from the first embodiment will be described here. In the second embodiment, in S905 in the flowchart in FIG. 9, the state monitoring part 343 in the service provider 340 does not transmit the HTML data for displaying the simple screen along with the state notification, and transmits only the state notification.

A process performed by the Web browser 330 in the MFP 101 will now be described with reference to the flowchart in FIG. 10. Only the difference from the first embodiment will be described here. In S1005, upon reception of the state notification, the state notification receiving part 333 acquires the screen information (HTML data) corresponding to the state described in the state notification from the HDD 214 managed by the screen information managing part 344. As described above, according to the second embodiment, the screen information for displaying the simple screen is stored in the Web browser 330 itself. As a result, it is not necessary for the state monitoring part 343 to transmit the screen information along with the state notification and, thus, it is possible to more rapidly display the simple screen.

Third Embodiment

A third embodiment will now be described. The MFP 101 displays the operation screen based on the screen information received from the Web server 102 after displaying the simple screen in the first embodiment. In contrast, a process when the MFP 101 displays the simple screen upon occurrence of an error and, then, returns from the error will be described in the third embodiment. The third embodiment specializes in the case in which an error occurs in the first and second embodiments.

Since the hardware configuration and the software configuration of an image processing system in the third embodiment are similar to the ones in the first embodiment, a description thereof is omitted herein.

For example, a case in which the MFP 101 returns from an error by a process of recovering from the error performed by the user will now be described. Specifically, in the case of a scanning error in the scanner 221, the MFP 101 returns from the error by removing a sheet jammed in a feeder (not shown). Alternatively, if an out-of-toner error occurs during the executing of a print job in the printer 220, the MFP 101 returns from the error by supplying the toner.

Even when the URL of (or the screen information on) the operation screen corresponding to the error is received from the Web server 102 in the state in which the MFP 101 returns from the error, it is not necessary for the MFP 101 to display the error screen.

Figure 12:
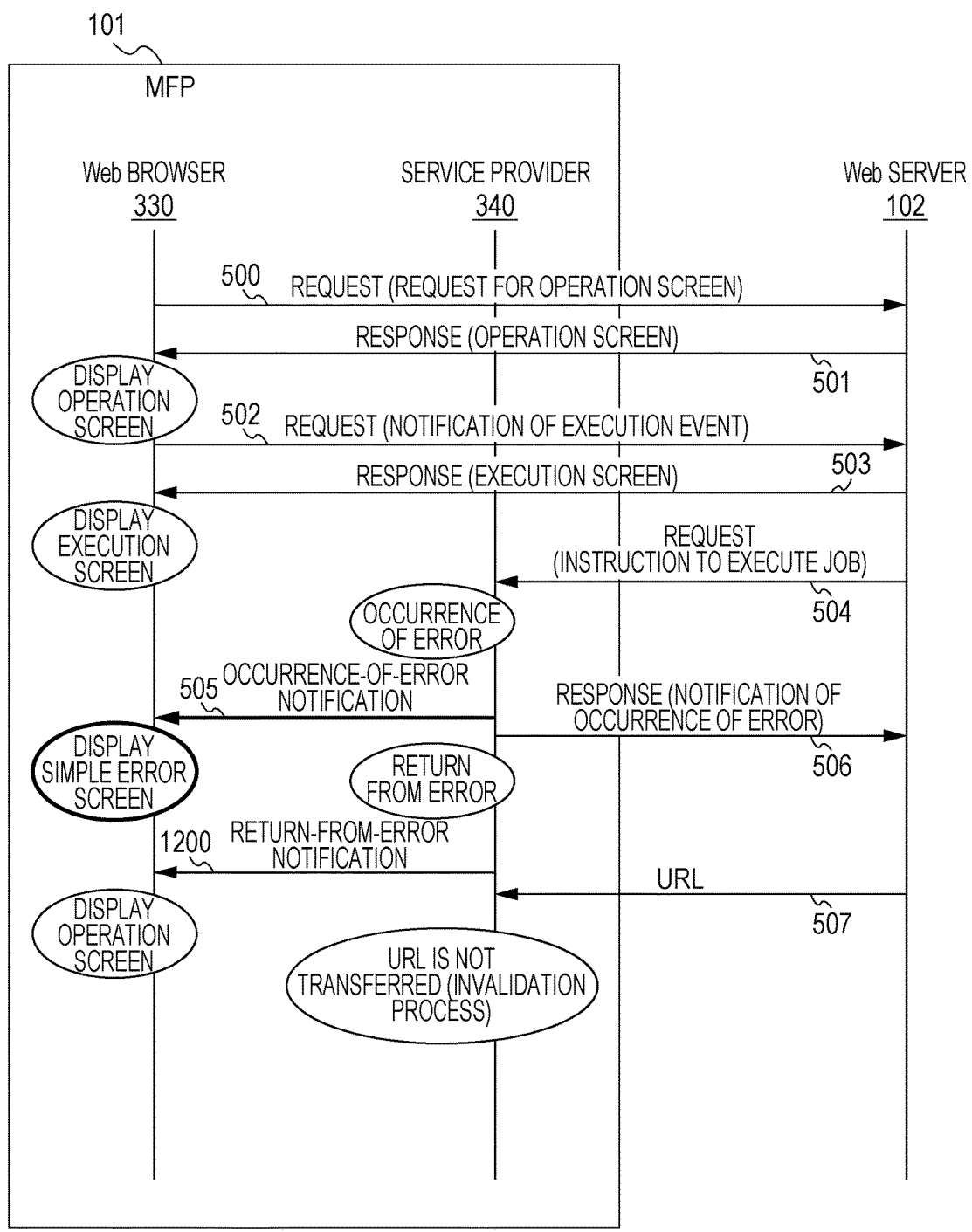
FIG. 12 is a sequence diagram indicating the operations of the Web browser 330, the Web server 102, and the service provider 340 in an embodiment of the present invention.

Accordingly, in the present embodiment, a process upon occurrence of an error will be described in detail. FIG. 12 is a sequence diagram indicating the operations of the Web browser 330, the Web server 102, and the service provider 340 in the third embodiment. The sequences until an error occurs during the execution of the processing by the service provider 340 and the occurrence-of-error notification is transmitted (500 to 506 in FIG. 12) are the same as in the sequence diagram in FIG. 5.

Upon detection of return from the error, the service provider 340 transmits a return-from-error notification 1200 indicating the return from the error to the Web browser 330. Upon reception of the return-from-error notification 1200, the Web browser 330 refers to the data that is cached and held to display the operation screen that was displayed before displaying the error screen shown in FIG. 6C. Alternatively, the Web browser 330 transmits the request 500 again and receives the response 501 to display the operation screen. The service provider 340 invalidates the URL 507 received from the Web server 102, without transferring the URL 507 to the Web browser 330. Specifically, the service provider 340 discards the received URL 507. In addition, the service provider 340 controls the MFP 101 so that the execution of the job that is suspended due to the occurrence of the error is restarted. It may be necessary to perform the recovery process to execute at least part of the job again depending on the type of the error that has occurred. The service provider 340 performs the recovery process, if needed, in the case of the return from the error.

Figure 13:
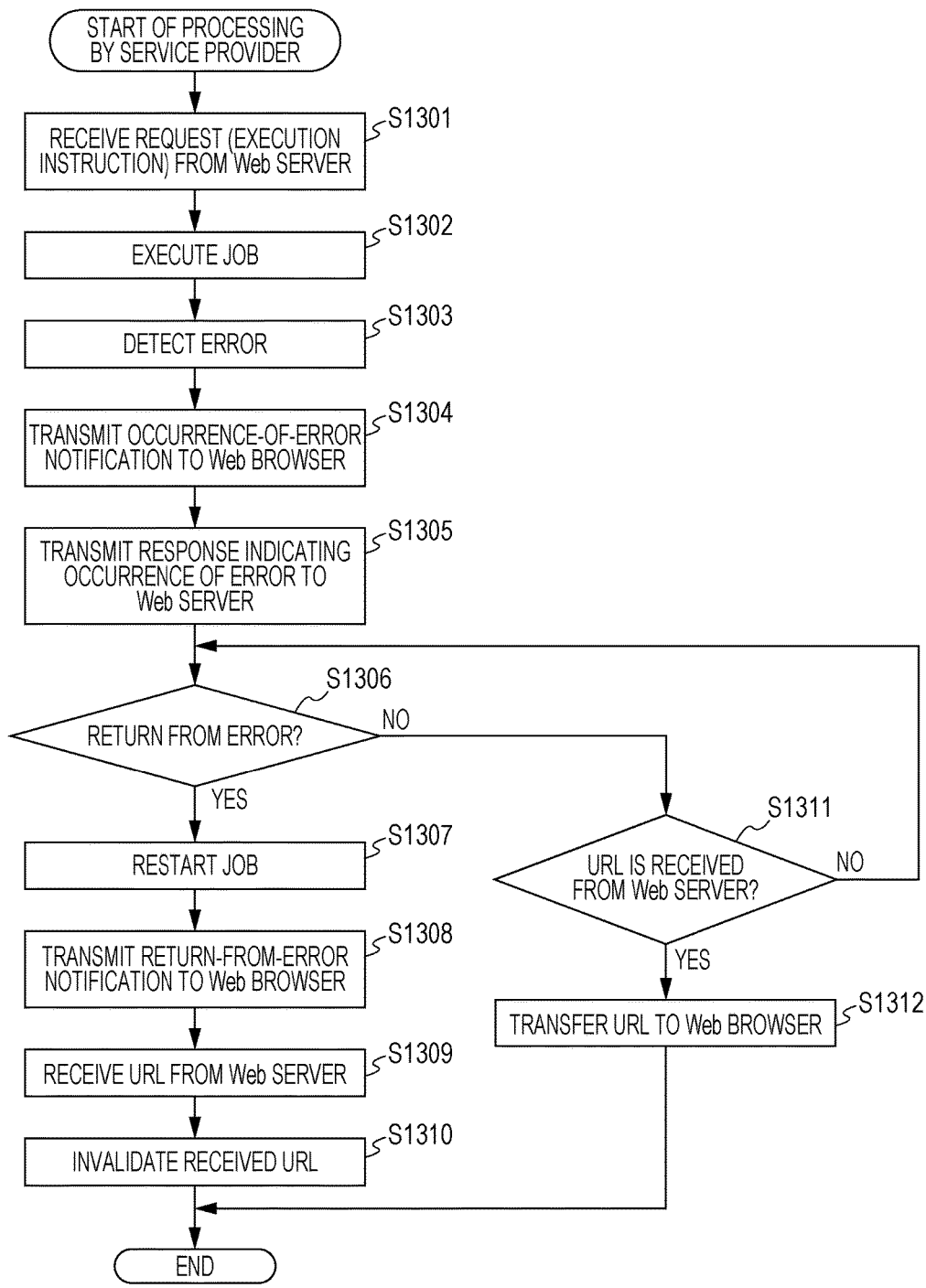
FIG. 13 is a flowchart showing a process performed by the service provider 340 in the embodiment of the present invention.

A process performed by the service provider 340 in the MFP 101 in the third embodiment will now be described with reference to FIG. 13. Each step shown in the flowchart in FIG. 13 is realized by the CPU 211 that executes a program stored in the ROM 212.

The processing in S1301 and S1302 is the same as in S901 and S902 in FIG. 9.

In S1303, the state monitoring part 343 detects an occurrence of an error. Upon detection of the error, in S1304, the state monitoring part 343 transmits the occurrence-of-error notification 505 to the state notification receiving part 333 in the Web browser 330.

Although the processing in S103 is not necessarily performed because an error does not necessarily occur when the MFP 101 executes a job, it is assumed here that the error has occurred. The processing according to S904 to S907 in the flowchart in FIG. 9 is performed if the normal completion of the job, instead of an error, is detected in S1303, although not shown in the flowchart in FIG. 13. Specifically, in S904, the state notification (the job completion notification 700) is transmitted to the state notification receiving part 333 in the Web browser 330. In S905, the instruction accepting part 341 transmits the response 701 (the state completion notification) to the execution instructing part 312 in the Web server 102. In S906, the URL 507 is received from the execution instructing part 312 in the Web server 102. In S907, the URL 508 is transferred to the Web browser 330.

In S1305, the instruction accepting part 341 in the service provider 340 transmits the response 506 to the execution instructing part 312 in the Web server 102. If the state monitoring part 343 detects the return from the error in S1306, the process goes to S1307.

In S1307, the job creating part 342 restarts the job that is suspended. If it is detected that the restarted job is normally completed, the processing according to S904 to S907 in the flowchart in FIG. 9 is performed, as in the case in which it is detected in S1303 that the job is normally completed.

In S1308, the service provider 340 transmits the return-from-error notification 1200 to the Web browser 330.

In S1309, the instruction accepting part 341 receives the URL 507 from the execution instructing part 312 in the Web server 102. In S1310, the state monitoring part 343 invalidates the URL. Specifically, the state monitoring part 343 discards the received URL.

If the determination in S1306 is negative, that is, if the state monitoring part 343 does not detect the return from the error, the process goes to S1311. In S1311, the instruction accepting part 341 determines whether the URL 507 is received from the execution instructing part 312 in the Web server 102. The process goes to S1312 if the instruction accepting part 341 determines that the URL 507 is received and the process otherwise goes back to S1306. In S1312, the state monitoring part 343 transfers the URL 507 received by the instruction accepting part 341 to the state notification receiving part 333 in the Web browser 330.

A process performed by the Web browser 330 in the MFP 101 in the third embodiment will now be described with reference to FIG. 14. Each step shown in the flowchart in FIG. 14 is realized by the CPU 211 that executes a program stored in the ROM 212. The flowchart in FIG. 14 shows the process when the MFP 101 returns from the error after the Web browser 330 displays the error screen in the manner described with reference to the flowchart in FIG. 10. The processing in S1401 to S1404 is the same as that in S1001 to S1004 in FIG. 10.

In S1405, the state notification receiving part 333 receives the occurrence-of-error notification 505 and the screen information.

The processing in S1006 to S1009 in the flowchart in FIG. 10 is performed if the job completion notification 700, instead of the occurrence-of-error notification 505, is received in S1405, although not shown in the flowchart in FIG. 14. Specifically, in S1006, the screen displaying part 334 displays the screen in FIG. 8C on the basis of the HTML data received with the job completion notification 700. In S1007, the state notification receiving part 333 receives the URL 508 transferred from the service provider 340. In S1008, the communication part 331 requests the operation screen identified by the URL 508. In S1009, the screen displaying part 334 displays the screen shown in FIG. 8D.

Upon reception of the occurrence-of-error notification 505 in S1405, in S1406, the screen displaying part 334 displays the simple screen in FIG. 6C on the basis of the screen information received with the occurrence-of-error notification 505.

In S1407, the state notification receiving part 333 determines whether the return-from-error notification 1200 is received from the service provider 340. If the return-from-error notification 1200 is received, the process goes to S1408. In S1408, the state notification receiving part 333 instructs the screen displaying part 334 to display the operation screen displayed by the screen displaying part 334 in the operation unit 219 before the occurrence of the error. The screen displaying part 334 refers to the data that is cached and held to display the operation screen. If there is no data that is cached and held, the communication part 331 transmits the request 502 again and receives the response 503 from the Web server 102. The screen displaying part 334 displays an operation screen on the basis of the screen information included in the response 503. The Web browser 330 displays the screen that was displayed before the occurrence of the error in the above manner.

If the determination in S1407 is negative, that is, if the state notification receiving part 333 does not receive the return-from-error notification 1200, the process goes to S1409. In S1409, the state notification receiving part 333 determines whether the transferred URL 508 is received. The process goes to S1410 if the transferred URL 508 is received and otherwise goes back to S1407. In S1410, the communication part 331 transmits the request 509 to the Web server 102 on the basis of the transferred URL 508.

In S1411, a process to display the screen in FIG. 6D is performed. Specifically, the communication part 331 receives the response 510 to the request 509 from the screen providing part 311 in the Web server 102. The analysis part 332 analyzes the HTML data included in the received response 510. The screen displaying part 334 displays an operation screen corresponding to the error in the operation unit 219 on the basis of the result of the analysis by the analysis part 332.

According to the present embodiment, upon return from an error, the service provider 340 does not transfer the URL received from the Web server 102 to the Web browser 330. As a result, a situation in which a screen corresponding to an error is displayed despite the fact that the job is restarted after the return from the error can be avoided.

Other Embodiments

Furthermore, the present invention is realized by performing the following processing. Specifically, software (programs) realizing the functions of the above embodiments is supplied to a system or an apparatus over a network or through any one of various storage media, the computer (or the CPU or a micro processor unit (MPU)) in the system or the apparatus reads out the programs to execute the programs.

The present invention is not limited to the above embodiments, and various changes and variations may be made without departing from the spirit or scope of the present invention. Accordingly, the following claims are appended in order to make the range of the present invention clear.

According to the present invention, it is possible to provide a mechanism to rapidly notify the user of a change in the state of a job executed in the image processing apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus that communicates with a Web server via a network, the image processing apparatus comprising:
   a display device;
   a scanner device;
   a storage device that stores error screen data to be displayed on the display device, wherein the error screen data is stored in the storage device in advance, and wherein the error screen data is not acquired from the Web server;
   at least one processor; and
   a memory device that stores a set of instructions which, when executed by the at least one processor, causes the at least one processor to perform the following operations of at least the following modules:
   a web-based communication module configured to
   send a first request for screen information to the Web server on the network,
   receive a first Web page from the Web server in response to the first request,
   display a scan operation screen based on the first Web page on the display device,
   send a second request for performing scan processing using the scanner device to the Web server based on receiving an execution instruction for the scan processing from a user via the scan operation screen,
   receive a second Web page from the Web server in response to the second request, and
   display a scan execution screen based on the second Web page;
   a job execution module configured to
   receive a scan request instruction, as a response to the second request for performing the scan processing, from the Web server, and
   execute a scan job for performing the scan processing using the scanner device based on the scan request instruction received from the Web server;
   an event detection module configured to detect an occurrence of an event concerning the scan job being executed by the job execution module, wherein the execution of the scan job by the job execution module is caused by the scan request instruction received from the Web server, and the detected event concerning the scan job includes at least an error event indicating that a paper jam in the scanner device has occurred while the scan job is being executed and an error removal event indicating that the paper jam has been removed; and
   a control module configured to automatically switch display on the display device from the scan execution screen based on the second Web page received from the Web server, being displayed on the display device, to an error screen based on the error screen data stored in the storage device of the image processing apparatus, based on the event detection module detecting the occurrence of the error event, and to automatically switch the display on the display device from the error screen based on the error screen data stored in the storage device of the image processing apparatus, being displayed on the display device, to a screen that is based on a Web page received from the Web server and is different from the scan execution screen, based on the event detection module detecting the occurrence of the error removal event,
   wherein the event detection module notifies both of the Web server and the control module about the error event in a case where the error event is detected.

2. The image processing apparatus according to claim 1, wherein, in a case where the occurrence of an event associated with a completion of the scan processing concerning the scan job is detected by the event detection module, the control module controls the web-based communication module to send a third request for screen information to the Web server, receive a third Web page from the Web server in response to the third request, and display a third screen based on the third Web page, and
wherein in a case where the occurrence of the error event indicating that a paper jam in the scanner device has occurred in connection with the scan job is detected by the event detection module, the control module notifies the Web server of the error occurrence concerning the paper jam in response to the instruction related to the second request for performing the scan processing, and controls the display device to display the error screen based on the error screen data stored in the storage device of the image processing apparatus, without waiting for a response, from the Web server, to the notification of the error occurrence concerning the paper jam.

3. The image processing apparatus according to claim 1, wherein, triggered by the detection, by the event detection module, of the occurrence of the error event indicating that a paper jam in the scanner device has occurred in connection with the scan job, the control module notifies the Web server of the error occurrence concerning the paper jam in response to the instruction related to the second request for performing the scan processing, and controls the display device to display the error screen based on the error screen data stored in the storage device of the image processing apparatus, without waiting for a response, from the Web server, to the notification of the error occurrence concerning the paper jam.

4. The image processing apparatus according to claim 1, wherein the error screen data stored in the storage device is in an HTML format, and, in a case where the occurrence of the error event indicating that a paper jam in the scanner device has occurred in connection with the scan job is detected by the event detection module, the control module controls the web-based communication module to cause the display device to display the error screen.

5. The image processing apparatus according to claim 4, wherein, in a case where the occurrence of the error event indicating that a paper jam in the scanner device has occurred in connection with the scan job is detected by the event detection module, the control module notifies the Web server of the error occurrence concerning the paper jam in response to the received instruction related to the second request for performing the scan processing, and wherein, in accordance with receiving of a third Web page from the Web server in response to the notification of the error occurrence concerning the paper jam, the web-based communication module stops displaying the error screen and displays a detailed error screen based on the received third Web page which includes more detailed error information than at least the error screen.

6. The image processing apparatus according to claim 5, wherein, in a case where an occurrence of an event associated with return from an error is detected by the event detection module, the web-based communication module sends the first request for screen information to the Web server, and wherein, in accordance with receiving of the first Web page from the Web server in response to the first request, the web-based communication module stops displaying the error screen or the detailed error screen and displays the scan operation screen based on the first Web page on the display device.

7. The image processing apparatus according to claim 1, wherein, in a case where a failure occurs during the execution by the job execution module of the scan job for performing the scan processing using the scanner device based on the scan request instruction received from the Web server, the detection module detects the event associated with the error occurrence related to the failure concerning the scan job.

8. The image processing apparatus according to claim 1, wherein the web-based communication module sends a SOAP (Simple Object Access Protocol) request to the Web server as the second request for performing the scan processing, and wherein the job processing module executes the scan job for performing the scan processing based on an instruction included in a SOAP response related to the second request for performing the scan processing.

9. The image processing apparatus according to claim 1, wherein the first Web page includes at least a form for the execution instruction for the scan processing and a form for receiving one or more settings for the scan processing, and wherein the second request for performing the scan processing to be sent to the Web server includes the one or more received settings for the scan processing.

10. A control method for an image processing apparatus that communicates with a Web server via a network, wherein the image processing apparatus comprises a display device, a scanner device, and a storage device that stores error screen data to be displayed on the display device, the error screen data stored in the storage device in advance, the control method comprising:

a web-based communication process comprising sending a first request for screen information to the Web server on the network, receiving a first Web page from the Web server in response to the first request, displaying a scan operation screen based on the first Web page on the display device, sending a second request for performing scan processing using the scanner device to the Web server based on receiving an execution instruction for the scan processing from a user via the scan operation screen, receiving a second Web page from the Web server in response to the second request, and displaying a scan execution screen based on the second Web page;

a job execution process comprising receiving a scan request instruction, as a response to the second request for performing the scan processing, from the Web server, and executing a scan job for performing the scan processing using the scanner device based on the scan request instruction received from the Web server;

an event detection process comprising detecting an occurrence of an event concerning the scan job being executed in the job execution process, wherein the execution of the scan job by the job execution module is caused by the scan request instruction received from the Web server, and the detected event concerning the scan job includes at least an error event indicating that a paper jam in the scanner device has occurred while the scan job is being executed and an error removal event indicating that the paper jam has been removed; and a control process configured to automatically switch display on the display device from the scan execution screen based on the second Web page received from the Web server, being displayed on the display device, to an error screen based on the error screen data stored in the storage device of the image processing apparatus, based on the event detection module detecting the occurrence of the error event, and to automatically switch the display on the display device from the error screen based on the error screen data stored in the storage device of the image processing apparatus, being displayed on the display device, to a screen that is based on a Web page received from the Web server and is different from the scan execution screen, based on the event detection module detecting the occurrence of the error removal event, wherein the event detection module notifies both of the Web server and the control module about the error event in a case where the error event is detected.

11. A non-transitory computer-readable storage medium storing instructions that, when executed, cause an image processing apparatus to perform a process, wherein the image processing apparatus communicates with a Web server via a network, and the image processing apparatus includes a display device, a scanner device, and a storage device that stores error screen data to be displayed on the display device, the error screen data stored in the storage device in advance, the process comprising:

a web-based communication process comprising sending a first request for screen information to the Web server on the network, receiving a first Web page from the Web server in response to the first request, displaying a scan operation screen based on the first Web page on the display device, sending a second request for performing scan processing using the scanner device to the Web server based on receiving an execution instruction for the scan processing from a user via the scan operation screen, receiving a second Web page from the Web server in response to the second request, and displaying a scan execution screen based on the second Web page;

a job execution process comprising receiving a scan request instruction, as a response to the second request for performing the scan processing, from the Web server, and executing a scan job for performing the scan processing using the scanner device based on the scan request instruction received from the Web server;

an event detection process comprising detecting an occurrence of an event concerning the scan job being executed in the job execution process, wherein the execution of the scan job by the job execution module is caused by the scan request instruction received from the Web server, and the detected event concerning the scan job includes at least an error event indicating that a paper jam in the scanner device has occurred while the scan job is being executed and an error removal event indicating that the paper jam has been removed; and a control process configured to automatically switch display on the display device from the scan execution screen based on the second Web page received from the Web server, being displayed on the display device, to an error screen based on the error screen data stored in the storage device of the image processing apparatus, based on the event detection module detecting the occurrence of the error event, and to automatically switch the display on the display device from the error screen based on the error screen data stored in the storage device of the image processing apparatus, being displayed on the display device, to a screen that is based on a Web page received from the Web server and is different from the scan execution screen, based on the event detection module detecting the occurrence of the error removal event, wherein the event detection module notifies both of the Web server and the control module about the error event in a case where the error event is detected.

* * * * *